July 1, 1958     W. KRÄMER     2,841,755
ARRANGEMENT FOR STABILIZING THE VOLTAGE OF
A SYNCHRONOUS ALTERNATOR Filed Dec. 9, 1953     2 Sheets-Sheet 1

INVENTOR
Werner Krämer
BY
Michael S. Striker
ATTORNEY

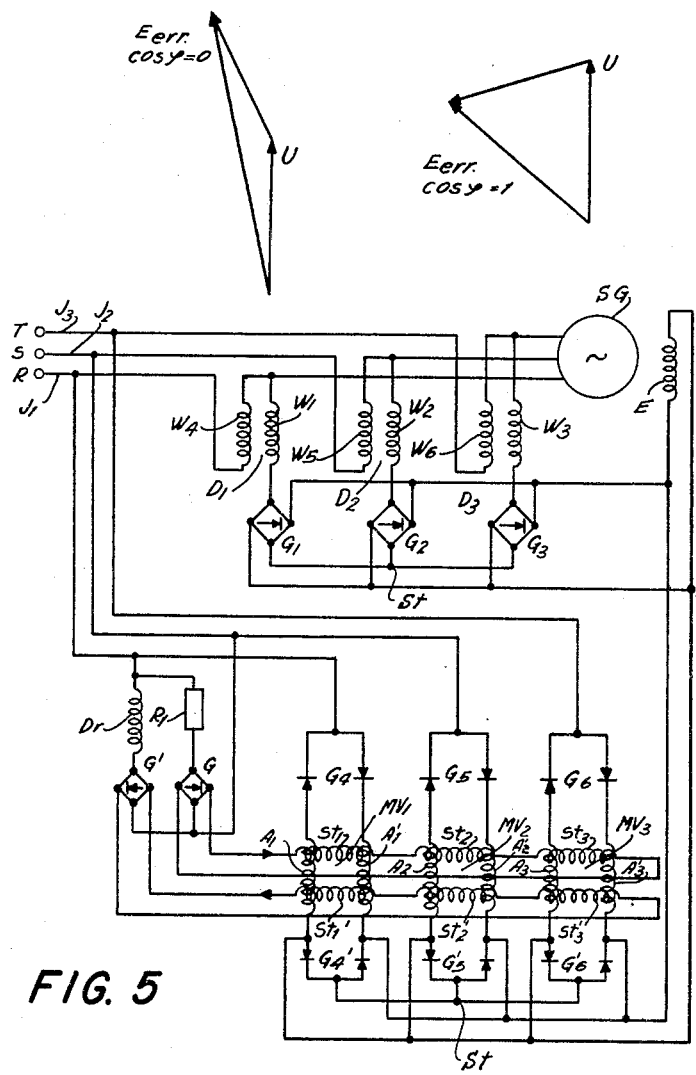

United States Patent Office 2,841,755
Patented July 1, 1958

2,841,755

ARRANGEMENT FOR STABILIZING THE VOLTAGE OF A SYNCHRONOUS ALTERNATOR

Werner Krämer, Darmstadt, Germany, assignor to Licentia Patent-Verwaltungs-G. m. b. H., Hamburg, Germany Application December 9, 1953, Serial No. 397,183

Claims priority, application Germany December 11, 1952

5 Claims. (Cl. 322—25)

The present invention relates to an arrangement for stabilizing the voltage of a synchronous A. C. generator.

The reduction of potential of the synchronous A. C. generator under load results partly from the ohmic and inductive voltage drop in the winding, mainly however from the demagnetizing effect of the load current. Therefore, compensated synchronous machines have been built in which the armature-ampere windings are compensated by a proportional adjustment of the exciting current. For example, the load current has been conducted, as additional exciting current, directly to the exciting winding via current transformers and rectifiers. This simple arrangement has the disadvantage that the phase of the back ampere turns in the armature is not taken into consideration and that the machine can be compensated but for a fixed power factor. A certain phase dependence may be obtained when also the no-load excitation is drawn from the engine as self excitation via an additional resistance and when this current, before being rectified, is compounded with the compensating current. Here at, the compensating current is added to the no-load exciting current at such a phase disposition that both components are added up in case of inductive load and are composed at right angles under real load. With such an arrangement an approximate compensation of the load-ampere windings may be attained especially in case of solid drum machines.

In this prior art the considerable cost of the arrangement is a disadvantage particularly since it is designed to be applied especially to machines of small output. In addition to the choking coils serving as intermediate resistance three further current transformers are also required.

The invention relates to an arrangement, that can be produced at comparatively lower cost, for stabilizing the voltage of a synchronous A. C. generator and it comprises, in combination, generator means including an exciting winding, three phase conductors and a neutral point; three reactor means, each having at least first and second primary windings and a secondary winding, each of said first primary windings being connected in series with a different one of said phase conductors, each of said second primary windings being connected in series with a phase conductor adjacent the one in which its first primary winding is in series, and each of said secondary windings being connected at one end thereof to the same phase conductor as its first primary winding; and three rectifier means, each having input and output terminals, said input terminals being connected between the other end of different ones of said secondary windings respectively, and said neutral point, and said output terminals being connected in parallel with said exciting winding.

Embodiments of the invention are shown in the drawing.

Figs. 4 and 4a are vector diagrams; and

Fig. 5 is a diagram illustrating a further embodiment of the invention.

Figure 1:
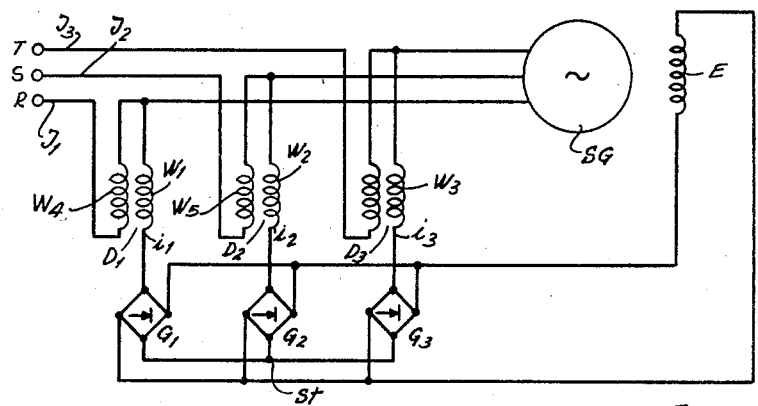
Fig. 1 is a diagram illustrating one embodiment of the invention.

In Fig. 1 the exciting winding E of the synchronous A. C. generator SG is excited by the direct current from the rectifiers $G_1$, $G_2$ and $G_3$ paralleled on the output side. The rectifiers $G_1$, $G_2$ and $G_3$ are supplied with the generator potentials $U_1$, $U_2$ and $U_3$ via the air gap chokes $D_1$, $D_2$ and $D_3$ having windings $W_1$, $W_2$ and $W_3$, respectively. While the rectifier output terminals respectively are connected each with one of the windings $W_1$, $W_2$, $W_3$, the rectifier input terminals are jointly connected to the neutral point $St$ of the threephase system R, S, T. Thus, the potential $U_1$ appears between R and $St$, the potential $U_2$ between S and $St$ and the potential $U_3$ between T and $St$. In this case preferably dry rectifiers are used. According to the invention, three potentials depending upon the load currents as to intensity and phase are added to the no-load voltages yielding the prime excitation of the generator due to the fact that the air gap chokes $D_1$, $D_2$, $D_3$ are provided with second windings $W_4$, $W_5$ and $W_6$, through which the load currents $J_1$, $J_2$ and $J_3$, respectively, are passed. The windings $W_1$ and $W_4$, $W_2$ and $W_5$, as well as $W_3$ and $W_6$ represent current transformers which allow of influencing the alternating currents $i_1$, $i_2$, $i_3$ which are supplied to the rectifiers $G_1$, $G_2$, $G_3$, respectively. The ohmic resistance in the excitation circuit may have the value $r$. If one considers only the conditions applying to the phase R, the choke $D_1$ and the rectifier $G_1$, there is—while the machine idles—the exciting current $$i_0 = \frac{U_1}{j.x_1}$$

wherein $x_1$ is the inductive reactance of the winding $W_1$ of the choking coil $D_1$. When the generator is working under load, the following potential equation results for the excitation circuit:

$$U_1 = i_1.j.x_1 - J_1.j.x_4.\ddot{u} + i_1.r$$

On the basis of a resistance ratio $$x_4 = \frac{x_1}{\ddot{u}^2}$$

there follows $$U_1 = i_1.j.x_1 - \frac{J_1}{\ddot{u}}.j.x_1 + i_1.r$$

from which $i_1$ may be determined:

$$i_1 = \frac{U_1 + \frac{J_1}{\ddot{u}}.j.x_1}{r + j.x_1}$$

wherein $r + j.x_1 = \text{const.} = z$

For the two limits $\cos \varphi = 0 (\text{Ind.})$ and $\cos \varphi = 1$ there results $$\cos \varphi = 0 \text{ (ind)} \quad i = \frac{U_1 + \frac{J_1}{\ddot{u}}.x_1}{z} = \frac{E_{err}}{z}$$

$$\cos \varphi = 1 \quad 1 = \frac{\sqrt{U_1^2 + \left(\frac{J_1}{\ddot{u}}\right)^2.x_1^2}}{z} = \frac{E_{err}}{z}$$

Figure 2A:
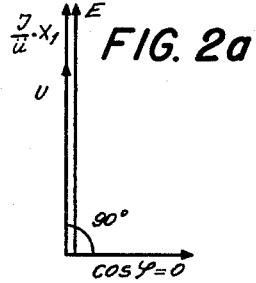
Figs. 2a, 2b and 2c are vector diagrams.
Figure 2B:
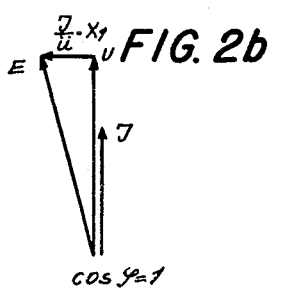
Figure 2C:
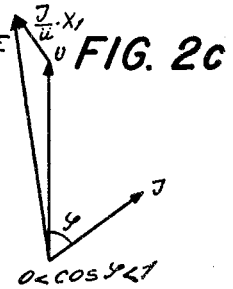

The vector diagram for $\cos \varphi = 0 (\text{ind.})$ is shown in Fig. 2a and the vector diagram for $\cos \varphi = 1$ is shown in Fig. 2b. Fig. 2c illustrates the vector diagram for a mixed ohmic-inductive load.

Thus, the absolute value of the exciting current corresponds always to the value required for a drum inductor.

Figure 3:
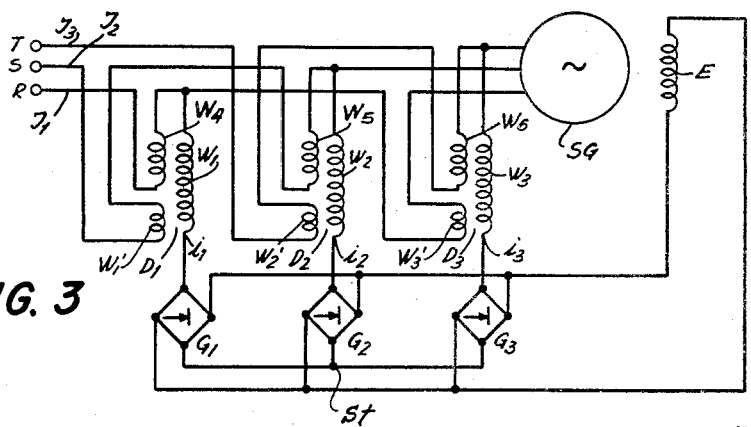
Fig. 3 is a diagram of a modified embodiment.

In case of machines with strongly defined poles the ohmic current component reacts upon the field but with a part of the value which results from the geometrical addition illustrated above. In this case there will be provided as illustrated in Fig. 3, apart from the windings $W_4$, $W_5$, $W_6$, still additional windings $W_1'$, $W_2'$, $W_3'$ through which the current of an adjacent phase respectively flows, so that with cos $\varphi=1$ the two voltage components are composed at an angle smaller than 90°. Thereby, with cos $\varphi=1$, the exciting voltage $E_{err}$ rises but little under the influence of the load current, while with cos $\varphi=0$ the components of the exciting voltage are added substantially algebraically.

The arrangement according to Fig. 3 corresponds to that according to Fig. 1. The winding $W_1'$ is passed by the load current $J_2$ of phase S, the winding $W_2'$ by the load current $J_3$ of phase T, and the winding $W_3'$ by the load current $J_1$ of phase R.

In order to attain the desired effect it is advisable to provide the no-load ampere windings not too small, thus to make the machine "hard." Figs. 4a and 4b show the vector diagrams for the arrangement according to Fig. 3. In Fig. 4a the case of inductive load (cos $\varphi=0$) is shown and in Fig. 4b the case of ohmic load (cos $\varphi=1$).

If it is desired to further increase the voltage stabilization, the amount of additional ampere windings required to attain perfect stabilization may be provided by means of three magnetic amplifiers $MV_1$, $MV_2$ and $MV_3$ controlled by the generator voltage. Such an arrangement is shown in Fig. 5. It operates as follows:

A measuring element consisting of the self saturating choke $Dr$, the resistance $R_1$ and the rectifying devices G and G' is connected to the phases R and S. The rectifying device G supplies the current to the controlling windings $St_1$, $St_2$, $St_3$ (connected in series) of the magnetic amplifiers $M_1$, $M_2$, $M_3$, respectively, while the current provided by the rectifying device G' correspondingly passes the control windings $St_1'$, $St_2'$ and $St_3'$ in opposite direction. At the rated voltage of the generator the magnetic amplifiers are premagnetized in such way that the operating voltage furnished by the magnetic amplifiers in connection with the voltage furnished by the rectifying devices $G_1$, $G_2$ and $G_3$ results in the correct exciting voltage. The operating coils of the magnetic amplifiers $A_1$ $A_1'$, $A_2$ $A_2'$, $A_3$ $A_3'$ are connected in series with the rectifying arrangements $G_4$ $G_4'$, $G_5$ $G_5'$, $G_6$ $G_6'$ respectively. If the generator voltage rises above the rated voltage, the current via the choke $Dr$ rises faster than the current via the resistance $R_1$. Consequently, the potential at the rectifying device G' rises more than at G and the magnetic amplifiers are premagnetized in a way that the delivered voltage decreases whereby the excitation of the synchronous generator decreases correspondingly. The combination of the magnetic amplifiers with the chokes $D_1$, $D_2$, $D_3$ offers the advantage, as compared to the prior art in which one magnetic amplifier produces the entire compensating power, that the time constant is much smaller. Instead of three individual magnetic amplifiers also a threephase magnetic amplifier may be used.

In connection with larger synchronous machines the described arrangement is used to operate not the field of the generator directly, but the field of the exciter machine.

In order to faciltate the self excitation of the generator by its remanent voltage, the chokes $D_1$, $D_2$, $D_3$ and, if desired, also part of the rectifiers may be short-circuited for a short time.

What I claim and desire to secure by Letters Patent of the United States is:

1. In a voltage stabilization arrangement, in combination, generator means including an exciting winding, three phase conductors and a neutral point; three reactor means, each having at least first and second primary windings and a secondary winding, each of said first primary windings being connected in series with a different one of said phase conductors, each of said second primary windings being connected in series with a phase conductor adjacent the one in which its first primary winding is in series, and each of said secondary windings being connected at one end thereof to the same phase conductor as its first primary winding; and three rectifier means, each having input and output terminals, said input terminals being connected between the other end of different ones of said secondary windings respectively, and said neutral point, and said output terminals being connected in parallel with said exciting winding.

2. In a voltage stabilization arrangement, in combination, generator means including an exciting winding, three phase conductors and a neutral point; three reactor means, each having at least first and second primary windings and a secondary winding, each of said first primary windings being connected in series with a different one of said phase conductors, each of said second primary windings being connected in series with a phase conductor adjacent the one in which its first primary winding is in series, and each of said secondary windings being connected at one end thereof to the same phase conductor as its first primary winding; and three bridge rectifier means, each having input and output terminals, said input terminals being connected between the other end of different ones of said secondary windings respectively, and said neutral point, and said output terminals being connected in parallel with said exciting winding.

3. In a voltage stabilization arrangement, in combination, generator means including an exciting winding, three phase conductors and a neutral point; three reactor means, each having at least one primary winding and a secondary winding, each of said primary windings being connected in series with a different one of said phase conductors, and each of said secondary windings being connected at one end thereof to the same phase conductor as its primary winding; three rectifier means, each having input and output terminals, said input terminals being connected between the other end of different ones of said secondary windings respectively, and said neutral point, and said output terminals being connected in parallel with said exciting winding; and three magnetic amplifier means, each having input and output terminals, said input terminals being connected between different ones of said phase conductors and said neutral point respectively, and output terminals being connected in parallel with said exciting winding.

4. In a voltage stabilization arrangement, in combination, generator means including an exciting winding, three phase conductors and a neutral point; three reactor means, each having at least one primary winding and a secondary winding, each of said primary windings being connected in series with a different one of said phase conductors, and each of said secondary windings being connected at one end thereof to the same phase conductor as its primary winding; three bridge rectifier means, each having input and output terminals, said input terminals being connected between the other end of different ones of said secondary windings respectively, and said neutral point, and said output terminals being connected in parallel with said exciting winding; and three magnetic amplifier means, each having input and output terminals, said input terminals being connected between different ones of said phase conductors and said neutral point respectively, and said output terminals being connected in parallel with said exciting winding.

5. In a voltage stabilization arrangement, in combination, generator means including an exciting winding, three phase conductors and a neutral point; three reactor means, each having at least one primary winding and a secondary winding, each of said primary windings being connected in series with a different one of said phase conductors, and each of said secondary windings being connected at one end thereof to the same phase conductor as its primary winding; three bridge rectifier means having dry rectifier elements, each of said rectifier means having input and output terminals, said input terminals being connected between the other end of different ones of said secondary windings respectively, and said neutral point, and said output terminals being connected in parallel with said exciting winding; and three magnetic amplifier means, each having input and output terminals, said input terminals being connected between different ones of said phase conductors and said neutral point respectively, and said output terminals being connected in parallel with said exciting winding.

References Cited in the file of this patent

UNITED STATES PATENTS

| | | |
|---|---|---|
| 2,146,779 | Swanson | Feb. 14, 1939 |
| 2,454,582 | Thompson et al. | Nov. 23, 1948 |
| 2,711,487 | Malivoir | June 21, 1955 |
| 2,712,107 | Bradley | June 28, 1955 |

FOREIGN PATENTS

| | | |
|---|---|---|
| 153,017 | Australia | Aug. 31, 1953 |
| 706,650 | Germany | Mar. 31, 1941 |